(12) United States Patent
Nishiyama

(10) Patent No.: US 8,687,084 B2
(45) Date of Patent: Apr. 1, 2014

(54) IMAGE PROCESSING APPARATUS AND METHOD

(75) Inventor: Tomohiro Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 13/164,534

(22) Filed: Jun. 20, 2011

(65) Prior Publication Data
US 2012/0002071 A1   Jan. 5, 2012

(30) Foreign Application Priority Data

Jul. 2, 2010 (JP) ................................. 2010-151972

(51) Int. Cl.
*H04N 5/228* (2006.01)
*H04N 5/247* (2006.01)
*G06K 9/36* (2006.01)

(52) U.S. Cl.
USPC .......................... 348/222.1; 348/264; 382/276

(58) Field of Classification Search
USPC ........................... 348/222.1, 264, 333.1, 344; 382/298–300, 266, 279
See application file for complete search history.

(56) References Cited

U.S. PATENT DOCUMENTS

| | | | | |
|---|---|---|---|---|
| 8,247,548 B2 * | 8/2012 | Yang et al. | ..................... | 540/576 |
| 8,249,440 B2 * | 8/2012 | Fan et al. | ........................ | 396/55 |
| 8,289,440 B2 * | 10/2012 | Knight et al. | ................. | 348/349 |
| 8,427,548 B2 * | 4/2013 | Lim et al. | .................... | 348/222.1 |
| 2007/0252074 A1 * | 11/2007 | Ng et al. | ..................... | 250/208.1 |
| 2010/0091133 A1 * | 4/2010 | Lim et al. | .................... | 348/223.1 |

OTHER PUBLICATIONS

Liang et al., "Programmable Aperture Photographer: Multiplexed Light Field Acquisition," National Taiwan University.
Fourier, Ren Ng, "Fourier Slice Photography," ACM SIGGRAPH, 2005.

* cited by examiner

*Primary Examiner* — Trung Diep
(74) *Attorney, Agent, or Firm* — Canon USA, Inc., IP Division

(57) ABSTRACT

The present invention is directed to a method for generating virtual image data at high resolution which is obtained when imaging is performed using a light ray incident on an imaging apparatus at a virtual position different from the actual position of an image sensor. A method for image processing includes acquiring light ray information, inputting virtual position information, generating first virtual image data which is obtained if the light ray is imaged at the virtual position with first resolution based on the light ray information and the virtual position information and inputting high resolution image data with second resolution higher than the first resolution, and generating second virtual image data which is obtained if the light ray is imaged at the virtual position with third resolution higher than the first resolution, based on the first virtual image data and the high resolution image data.

5 Claims, 16 Drawing Sheets

FIG.4
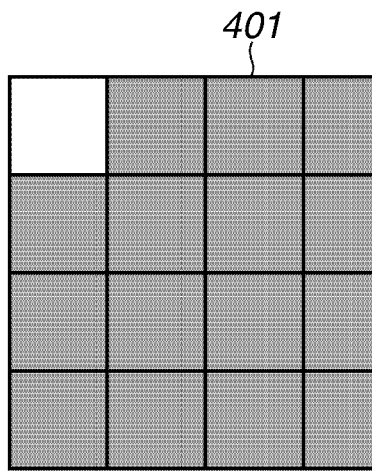
401
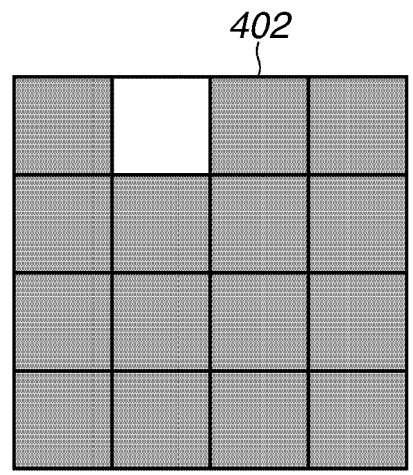
402
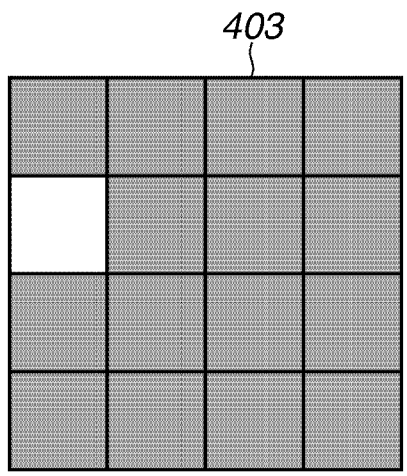
403
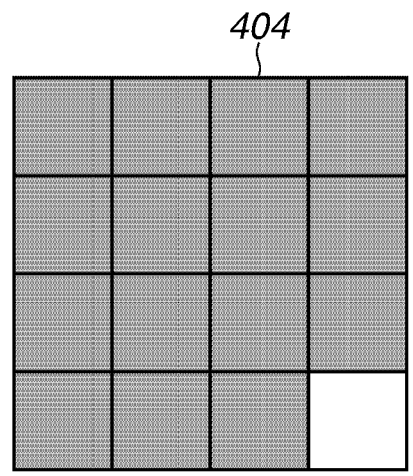
404
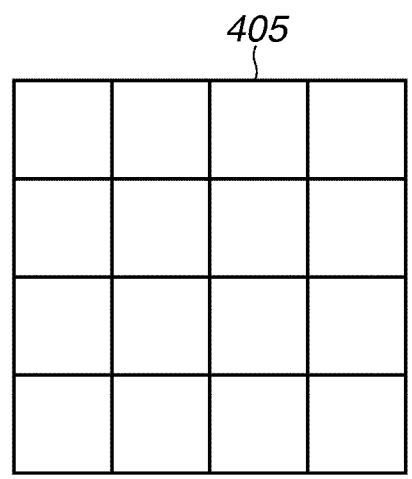
405

IMAGE PROCESSING APPARATUS AND METHOD

BACKGROUND OF THE INVENTION

1. Field of the Invention

The present invention relates to an image processing apparatus capable of generating virtual image data which is obtained when a light ray incident on an imaging apparatus is captured on a virtual position of an image sensor and an image processing method.

2. Description of the Related Art

There is a known technique for acquiring virtual image data called light field photography technique (R. NG "Fourier Slice Photography" (ACM SIGGRAPH 2005, 2005) hereinafter referred to as a non-patent literature 1). According to the light field photography technique, an image of an object is taken by using a light ray incident on an imaging apparatus (e.g., a camera) by an image sensor set at a virtual position which is different from an actual position. Regarding the light field photography technique, a path of a light ray (a light ray path) emitted the from an object and incident on the imaging apparatus is described as a straight line that passes through two points on two different planes in a three-dimensional space. Further, one light ray (or a group of light rays passing through an approximately the same light ray path and having an approximately the same light quantity) is considered as including a certain light quantity. According to the present invention, light ray information which is a combination of routing information about the light ray path and radiance information about the light quantity is called light field data (LF data). More specifically, the LF data is a function of four parameters of the light quantity of one light ray (four parameters that define each point in two planes). When a term light field (LF) is used, it means a "field" described by a plurality of LF data pieces.

Based on the LF data, the virtual image data is acquired. The virtual image data is obtained at a virtual position which is different from the actual position of the image sensor of the imaging apparatus, when imaging is performed using a light ray from an object and incident on the imaging apparatus. Acquisition of such virtual image data is discussed in the non-patent literature 1.

There are two main methods for acquiring the LF data. One is a method that acquires the LF data by arranging a micro lens array in front of the image sensor. The other is a method that controls an aperture position of a diaphragm and acquires the LF data (C. K. Liang, et al. "Programmable Aperture Photography: Multipixeled Light Field Acquisition" hereinafter referred to as a non-patent literature 2). In principle, when the virtual image data is generated based on the LF data obtained by arranging a micro lens array in front of the image sensor, the resolution of the virtual image given by the virtual image data will be lower compared to the resolution of the image sensor.

Further, according to the non-patent literature 2, the LF data is acquired using a variable aperture referred to as a programmable aperture. From the obtained LF data, a distance map whose resolution is same as the resolution of the image sensor is estimated, and high-quality image is generated by view interpolation using the distance map. The distance map is generated based on feature points of the image. Thus, it is not possible to generate an accurate distance map when the object has few edges or the object is substantially flat. Thus, according to the method discussed in the non-patent literature 2, it is substantially impossible to acquire virtual image data which is obtained when the imaging is performed by setting the image sensor at a virtual position with high resolution.

SUMMARY OF THE INVENTION

The present invention is directed to a method for generating virtual image data at high resolution which is obtained when imaging is performed using a light ray incident on an imaging apparatus at a virtual position different from the actual position of an image sensor.

According to an aspect of the present invention, an image processing apparatus includes an acquisition unit configured to acquire light ray information including routing information and radiance information of a light ray incident on an imaging apparatus from an object, a first input unit configured to input virtual position information indicating a virtual position of an image sensor in the imaging apparatus which is different from an actual position of the image sensor, a first generation unit configured to generate first virtual image data which is obtained if the light ray is imaged at the virtual position of the image sensor with first resolution based on the light ray information and the virtual position information, a second input unit configured to input high resolution image data indicating a high resolution image obtained by imaging the object with second resolution higher than the first resolution, and a second generation unit configured to generate second virtual image data which is obtained if the light ray is imaged at the virtual position of the image sensor with third resolution higher than the first resolution, based on the first virtual image data and the high resolution image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a conceptual drawing of a variable aperture.

DESCRIPTION OF THE EMBODIMENTS

Various exemplary embodiments, features, and aspects of the invention will be described in detail below with reference to the drawings.

<Block Diagram of the First Exemplary Embodiment>

Figure 1:
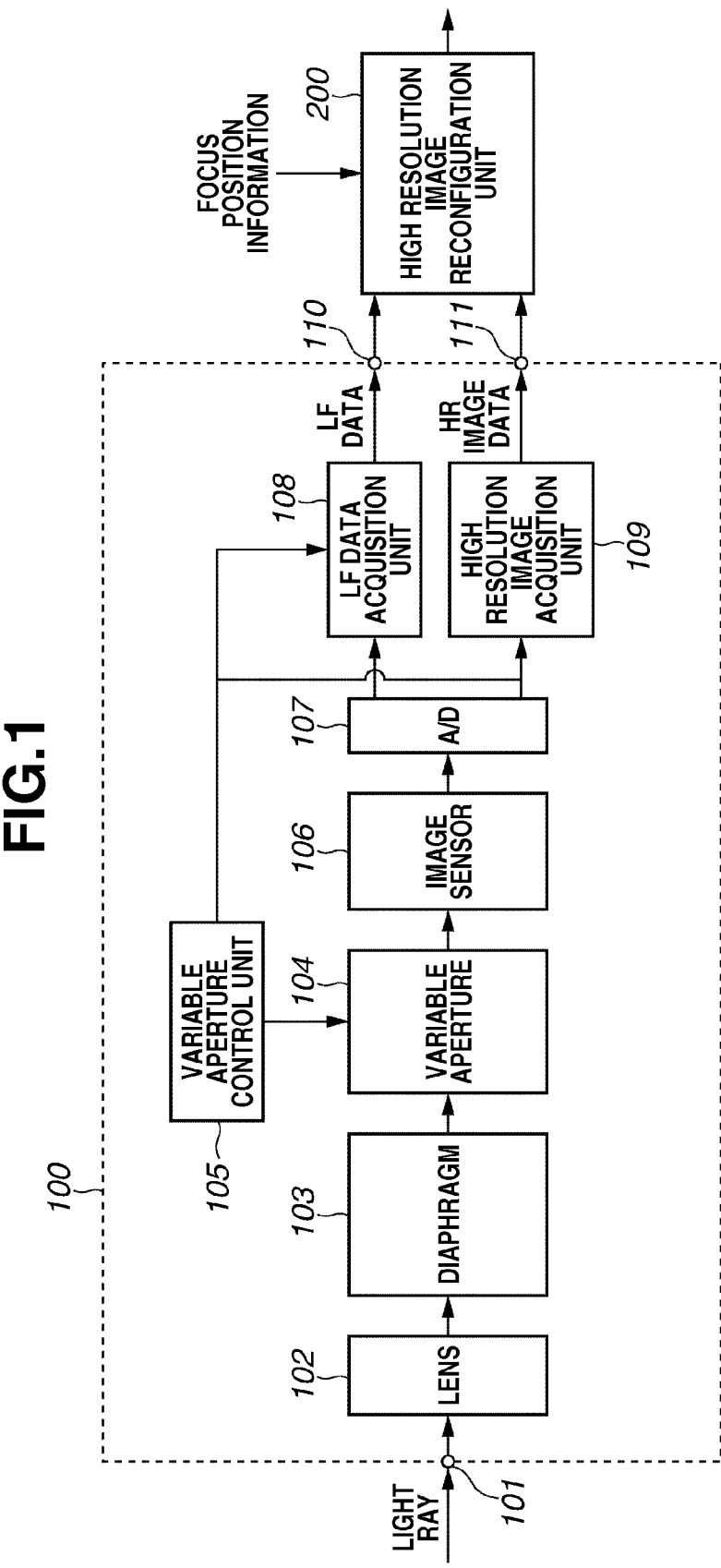
FIG. 1 is a block diagram illustrating an imaging apparatus according to a first exemplary embodiment of the present invention.

FIG. 1 is a block diagram illustrating an image processing method and an image processing apparatus according to a first exemplary embodiment. A light ray 101 from an object is incident on an imaging apparatus 100. Via an optical system including a lens (or a lens group) 102 and a diaphragm 103, the incident light ray 101 is incident on a variable aperture 104 used for acquiring LF data. A variable aperture control unit 105 controls an aperture position of the variable aperture 104. An image sensor 106 generates an analog signal by imaging the incident light ray. An analog-to-digital (A/D) conversion unit 107 converts the analog signal into a digital signal.

An LF data acquisition unit 108 converts a signal which is obtained by variously changing an aperture shape of the variable aperture 104 into the LF data. A high resolution image acquisition unit 109 acquires high resolution image data (HR image data) by setting the variable aperture 104 in a fully open state (or a state close to the fully open state). An LF data output terminal 110 is a terminal from which the LF data is output to a high resolution image reconfiguration unit 200. An HR image data output terminal 111 is a terminal from which the HR image data is output to the high resolution image reconfiguration unit 200.

Figure 2:
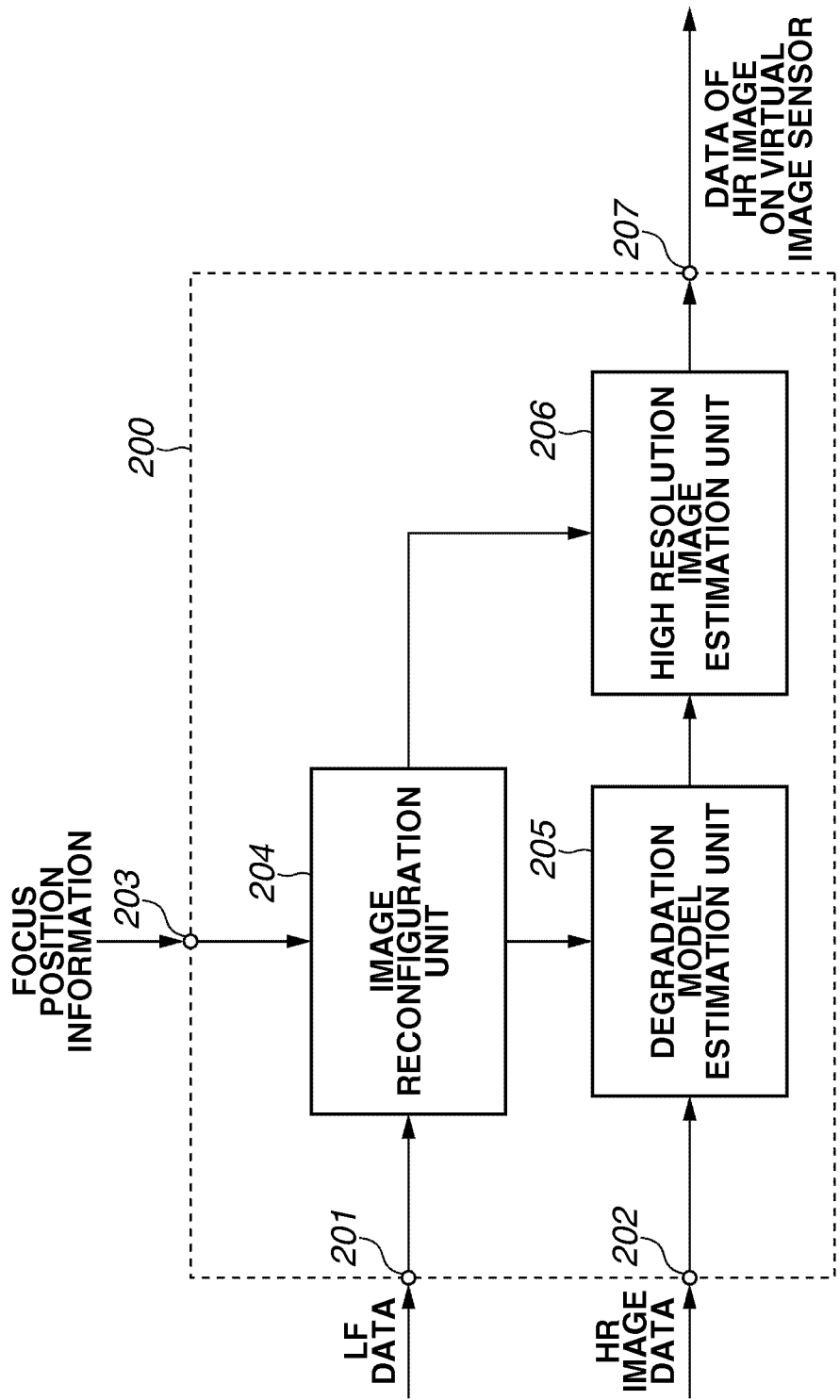
FIG. 2 is a block diagram illustrating a high resolution image reconfiguration unit.

FIG. 2 is a block diagram illustrating the high resolution image reconfiguration unit 200. An LF data input terminal 201 is a terminal via which the LF data is input in the high resolution image reconfiguration unit 200. An HR image input terminal 202 is a terminal via which the HR image data is input in the high resolution image reconfiguration unit 200. A focus position information input terminal 203 is a terminal via which position information of a virtual image sensor (i.e. virtual position information) is input in the high resolution image reconfiguration unit 200. The virtual image sensor is an image sensor virtually provided at a position different from the position of the actual image sensor.

By changing the position of the virtual image sensor, an image similar to an image which is obtained by adjusting a focal position after the photographing is performed, can be obtained. The position information about the virtual image sensor can be acquired from, for example, a focal position arbitrarily set by a user. As described below, if the focus is achieved, a distance between the lens and the image sensor is uniquely determined according to the lens equation where a distance "a" from the lens to the object and a focal length "f" of the lens are determined. Thus, by setting the distance to the object which the user desires to obtain focus, the position information of the virtual image sensor is uniquely determined.

An image reconfiguration unit 204 reconfigures an image on the virtual image sensor at an arbitrary position from the LF data. The image reconfiguration unit 204 can also reconfigure image data (first virtual image data) which is obtained when the imaging is performed at the actual position of the image sensor from the LF data. A degradation model estimation unit 205 estimates degradation model data (conversion model data) that indicates a conversion model of HR image data to the first virtual image data.

A high resolution image estimation unit 206 estimates high resolution image data on a virtual image sensor (HR image data on the virtual image sensor) using the image data reconfigured on the virtual image sensor and the degradation model data estimated by the degradation model estimation unit 205. An HR image output terminal 207 on the virtual image sensor is a terminal from which the HR image data on the virtual image sensor (second virtual image data) is output.

<Conceptual Drawing of the First Exemplary Embodiment>

Figure 3:
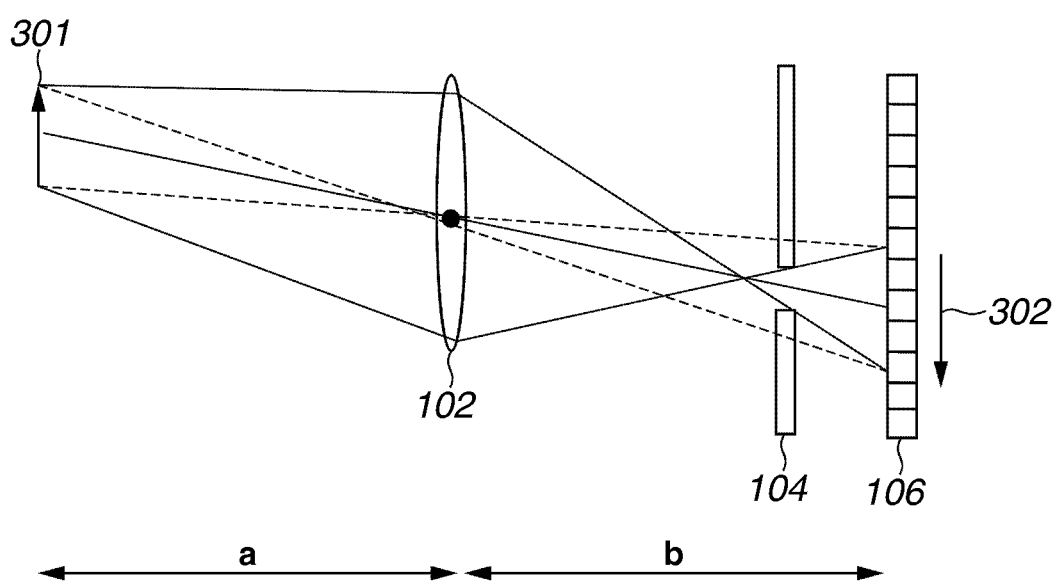
FIG. 3 is a conceptual drawing of the imaging apparatus.

FIG. 3 is a conceptual drawing of the imaging apparatus 100. The light from an object 301 is incident on the image sensor 106 via the lens 102 and the variable aperture 104. Accordingly, an object image 302 is projected on the image sensor 106. FIG. 3 shows the distance "a" between the object 301 and the lens 102, and the distance "b" between the lens 102 and the image sensor 106. When the focal length "f" of the lens 102 is given, "a", "b", and "f" satisfy the lens equation.

[Equation 1]

$$\frac{1}{a} + \frac{1}{b} = \frac{1}{f} \quad (1)$$

If the aperture portion of the variable aperture 104 is small enough, one light ray can be identified from the aperture position of the variable aperture 104 and the position of the image sensor 106. Accordingly, high precision LF data can be acquired.

FIG. 4 is a conceptual drawing of the variable aperture 104. In FIG. 4, the variable aperture is divided into 4*4 small apertures for convenience. The variable aperture control unit 105 temporally changes the shape of the variable aperture 104 into, for example, aperture shapes 401 to 404. Regarding the aperture shapes 401 to 404, the shaded portions indicate the closed portions and the white portions indicate the open portions of the aperture. FIG. 4 illustrates a case where the opening portion is sequentially changed from left to right and from top to bottom. The aperture shapes 401 to 404 do not represent all the aperture shapes of the variable aperture 104.

In addition to the above-described method, the control of the aperture shape discussed in the non-patent literature 2 can also be used as the control of the variable aperture 104.

As an actual configuration of the variable aperture 104, a liquid crystal array, whose aperture shape can be electrically controlled, is discussed in the non-patent literature 2.

An aperture shape 405 is the aperture shape of the variable aperture 104 at the time when the HR image data is acquired. In acquiring the HR image data, for example, the variable aperture 104 is fully opened.

<Operation of the First Exemplary Embodiment>

Figure 5:
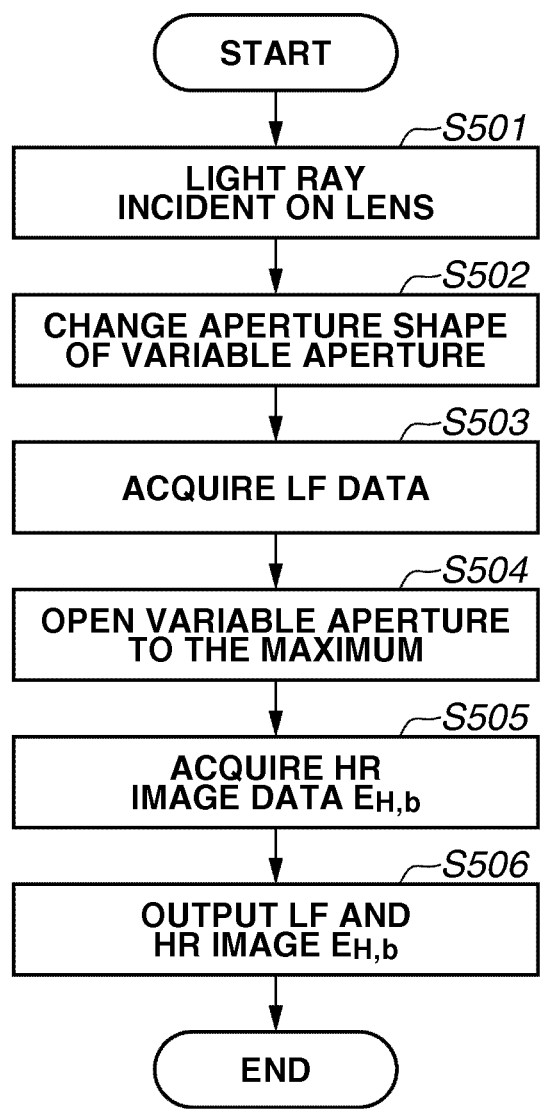
FIG. 5 is a flowchart illustrating an operation of the imaging apparatus according to the first exemplary embodiment.

Next, the operation of the imaging apparatus illustrated in FIG. 1 will be described with reference to the flowchart in FIG. 5. In step S501, a light ray from the object is incident on the lens. In step S502, the variable aperture control unit 105 changes the aperture shape of the variable aperture 104. In step S503, the LF data acquisition unit 108 acquires a signal which is obtained by changing the aperture shape of the variable aperture 104, and converts the signal into LF data $L_L$.

The reference mark "L" denotes the LF data and the subscript "L" denotes the resolution. The subscript "L" indicates the low resolution (not high resolution).

In step S504, the variable aperture control unit 105 fully opens the variable aperture 104. In step S505, the high resolution image acquisition unit 109 acquires a signal which is obtained by fully opening the aperture shape of the variable aperture 104 as HR image data $E_{H,b}$. The reference mark "E" denotes image data. The first subscript denotes the resolution and the second subscript denotes the position of the image sensor. Thus, the subscript "H" indicates that the high resolution and the subscript "b" indicates that the position of the image sensor is the position of the actual image sensor. In step S506, the LF data and the HR image data $E_{H,b}$ are output from the LF data output terminal 110 and the HR image data output terminal 111 respectively. Then, the operation of the imaging apparatus 100 ends.

<Operation of the High Resolution Image Reconfiguration Unit 200>

The high resolution image reconfiguration unit 200 is a processing unit that reconfigures (generates) high resolution image data on the virtual image sensor using the HR image data and the LF data.

Figure 6:
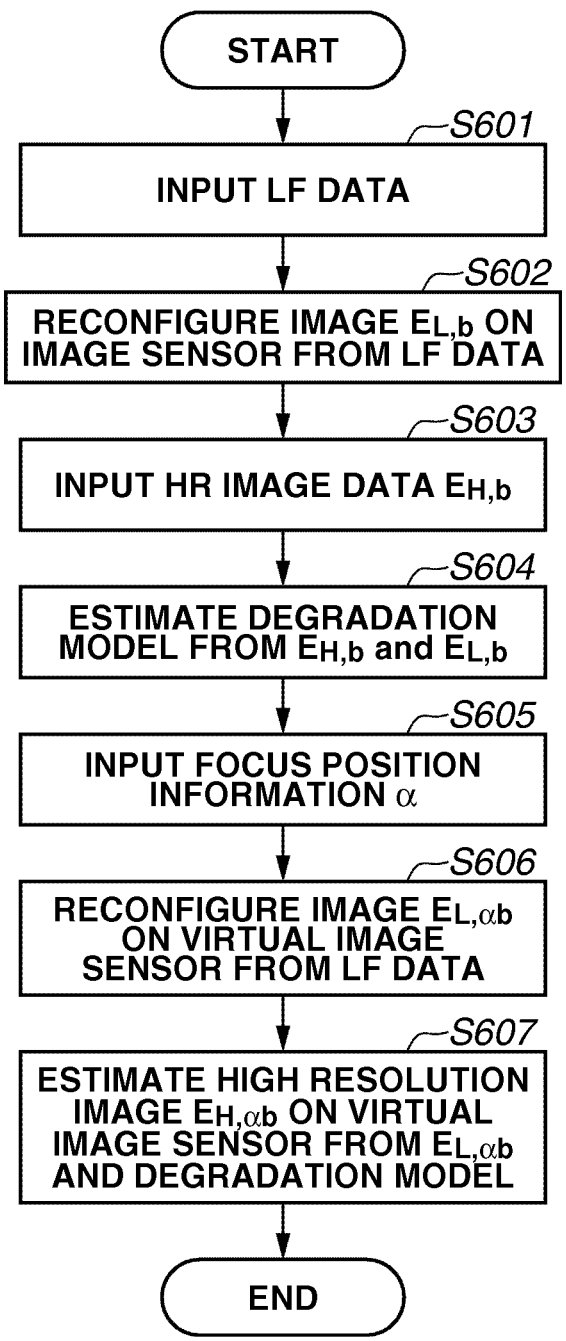
FIG. 6 is a flowchart illustrating an operation of the high resolution image reconfiguration unit.

The operation of the high resolution image reconfiguration unit 200 will be described below with reference to the flowchart illustrated in FIG. 6.

In step S601, the LF data is input in the image reconfiguration unit 204 via the LF data input terminal 201. In step S602, the image reconfiguration unit 204 reconfigures (generates) an image $E_{L,b}$ on the image sensor using the LF data. The subscript "L" indicates the low resolution. Further, the subscript "b" indicates the distance from the lens to the actual image sensor. The method for reconfiguring the image on the virtual image sensor using the LF data will be described below.

In step S603, the HR image data $E_{H,b}$ is input in the degradation model estimation unit 205 via the HR image input terminal 202. The subscript "H" indicates the high resolution. In step S604, the degradation model estimation unit 205 estimates degradation model data from high resolution to low resolution by using the image $E_{L,b}$ and the HR image data $E_{H,b}$.

In step S605, focus position information α is input in the image reconfiguration unit 204 via the focus position information input terminal 203. By multiplying the focus position information α by the distance b, which is the distance from the lens to the actual image sensor, a distance αb that is the distance from the lens to the virtual image sensor can be acquired.

In step S606, the image reconfiguration unit 204 reconfigures an image $E_{L,\alpha b}$ on the virtual image sensor located at the distance αb from the lens 102 using the LF data. In step S607, the high resolution image estimation unit 206 estimates the high resolution image on the virtual image sensor using the degradation model data and the image $E_{L,\alpha b}$. Then, the operation of the high resolution image reconfiguration unit 200 ends.

<Operation of the LF Data Acquisition Unit 108>

A method for acquiring the LF data from the image on the image sensor will be described.

Figure 7A:
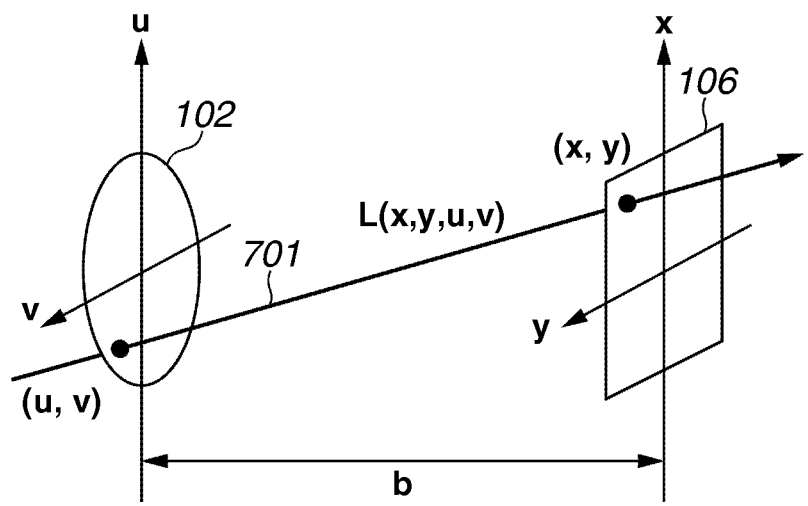
FIG. 7A is a conceptual drawing of LF data.
Figure 7B:
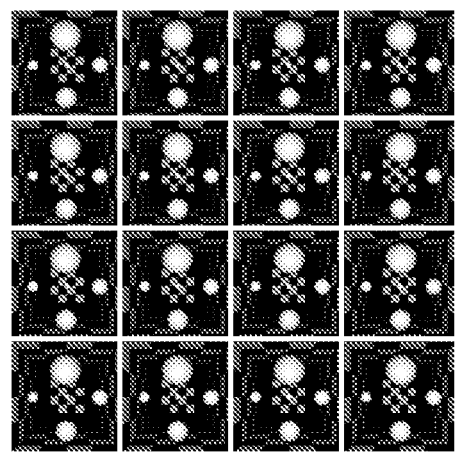
FIG. 7B illustrates an example of an image on an image sensor.

FIGS. 7A and 7B illustrate a conceptual drawing of the LF data and an example of an image on the image sensor 106 actually acquired with use of the variable aperture 104.

FIG. 7A is a conceptual drawing of the LF data. A light ray 701 passes through a point whose coordinates are (u, v) on the lens 102, and a point whose coordinates are (x, y) on the image sensor 106. The luminance of the light ray 701 is denoted as L(u,v,x,y).

FIG. 7B illustrates 4*4 small images. Each of the small images corresponds to the small apertures of the variable aperture 104 illustrated in FIG. 4 by one-to-one relation. Each image has a parallax. The LF data acquisition unit 108 identifies the light ray path according to the concept described with reference to FIG. 3 with using the barycentric coordinates of the small aperture and the coordinates of the image sensor, and acquires the luminance from the pixel values. Accordingly, a relation between the light ray path and the luminance is obtained, and the LF data can be acquired.

<Operation of the Image Reconfiguration Unit 204>

A method for reconfiguring an image on the virtual image sensor using the LF data will be described.

Figure 8:
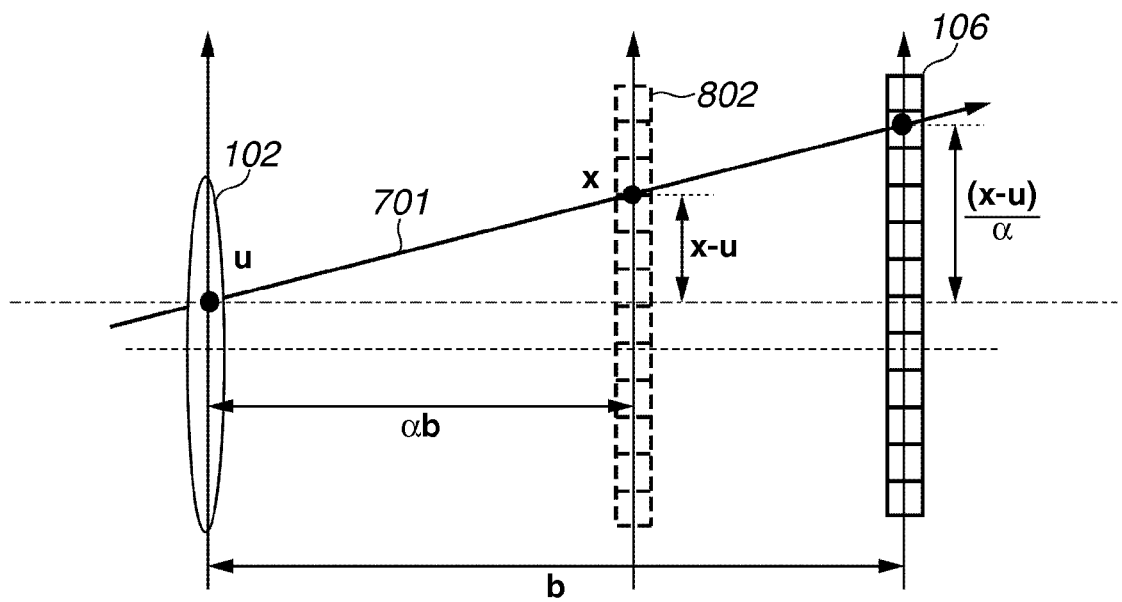
FIG. 8 is a conceptual drawing of how an image on a virtual image sensor is reconfigured using LF data.

FIG. 8 is a conceptual drawing illustrating the method for reconfiguring an image on the virtual image sensor using the LF data. FIG. 8 is a two-dimensional cross sectional view of FIG. 7A. A light ray that passes through a point on the virtual image sensor 802, whose coordinates are (x, y) and located at the distance αb from the lens 102, passes a point (u, v) on the lens 102 and a point (u+(x−u)/α, v+(y−v)/α) on the image sensor 106. Thus, the pixel value of the point whose coordinates are (x, y) on the virtual image sensor 802 is obtained by integrating L(u+(x−u)/α, v+(y−v)/α,u,v) by the coordinates (u, v) on the lens 102. Thus, the following equation is satisfied.

[Equation 2]

$$E_{L,\alpha b}(x, y) = \frac{1}{\alpha^2 b^2} \int_{Lens} L\left(\frac{(x-u)}{\alpha} + u, \frac{(y-v)}{\alpha} + v, u, v\right) du dv \quad (2)$$

The "Lens" in the integral range indicates that the range is an effective lens region including the influence of the diaphragm. A case where the diaphragm is considered will be described in detail in a second exemplary embodiment. The image $E_{L,b}$ (low resolution image data) on the actual image sensor can be obtained from the following equation.

[Equation 3]

$$E_{L,b}(x, y) = \frac{1}{b^2} \int_{Lens} L(x, y, u, v) du dv \quad (3)$$

Further, $P_\alpha[b](x, y)$ is defined by the operators below.

[Equation 4]

$$P_\alpha[L](x, y) \equiv \frac{1}{\alpha^2 b^2} \int_{Lens} L\left(\frac{(x-u)}{\alpha} + u, \frac{(y-v)}{\alpha} - v, u, v\right) du dv \quad (4)$$

<Operation Principle of the High Resolution Image Reconfiguration Unit 200>

The operation principle of the high resolution image reconfiguration unit 200 will be described.

Generally, the resolution of the LF data (resolution of x, y with respect to LF data L(u,v,x,y)) is lower than the original resolution of the image sensor. Such LF data is denoted as $L_L$. The subscript "L" indicates the low resolution. High resolution LF data in a case where division resolution on the image sensor 106 and the lens 102 is virtually high is denoted as $L_H$.

The subscript "H" indicates the high resolution. The low resolution LF data can be considered as a data obtained by weighting the high resolution LF data and integrating it. Thus, where the weighting factor is w, the following equation is satisfied.

[Equation 5]

$$L_L(x,y,u,v) = \int w(x-x', y-y', u-u', v-v') L_H(x',y',u',v') \, dx'dy'du'dv' \quad (5)$$

This is a convolution by a filter w. Generally, the filter w is a low pass filter.

The convolution by the filter w is defined by the following operator.

[Equation 6]

$$C_w^2[L](x,y) \equiv \int w(x-x', y-y') L(x',y') \, dx'dy' \quad (6)$$

[Equation 7]

$$C_w^4[L](x,y,u,v) \equiv \int w(x-x', y-y', u-u', v-v') L(x',y',u',v') \, dx'dy'du'dv' \quad (7)$$

The superscripts "2" and "4" of Cw indicate the number of dimensions. Referring to the non-patent literature 1, it is known that the following equation is satisfied.

[Equation 8]

$$P_\alpha[C_w^4[L]] = C_{P_\alpha[w]}^2[P_\alpha[L]] \quad (8)$$

The equation (7) indicates that the LF data which is reconfigured to a two-dimensional image after convolution using a four-dimensional weighting factor is equal to what is obtained by convolution using a two-dimensional weighting factor after the LF data is reconfigured to a two-dimensional image.

$P_\alpha$ is the operator defined by the equation (2).

Then, according to the equation (8), the following properties are satisfied.

[Equation 9]

$$E_{L,\alpha b} = P_\alpha[L_L] = P_\alpha[C_w^4[L_H]] = C_{P_\alpha[w]}^2[P_\alpha[L_H]] = C_{P_\alpha[w]}^2[E_{H,\alpha b}] \quad (9)$$

The equation (9) shows that the deterioration process from the high resolution image to the low resolution image on the virtual image sensor is due to the convolution using the filter $P_\alpha[w]$.

[Equation 10]

$$P_\alpha[w](x,y) = \frac{1}{\alpha^2 b^2} \int_{Lens} w\left(\frac{(x-u)}{\alpha} + u, \frac{(y-v)}{\alpha} + v, u, v\right) du\,dv \quad (10)$$

$$= \frac{1}{\alpha^2 b^2} \int_{Lens} w\left(\frac{x + (\alpha-1)u}{\alpha}, \frac{y + (\alpha-1)v}{\alpha}, u, v\right) du\,dv$$

The change of w is small compared to the change of $\alpha$. Thus, as long as $\alpha$ does not fluctuate widely from 1, the following approximate expression is satisfied.

[Equation 11]

$$P_\alpha[w](x,y) = \frac{1}{\alpha^2 b^2} \int_{Lens} w\left(\frac{x + (\alpha-1)u}{\alpha}, \frac{y + (\alpha-1)v}{\alpha}, u, v\right) du\,dv \quad (11)$$

$$\sim \frac{1}{\alpha^2 b^2} \int_{Lens} w\left(\frac{x}{\alpha}, \frac{y}{\alpha}, u, v\right) du\,dv$$

$$= \frac{1}{\alpha^2} P_1[w]\left(\frac{x}{\alpha}, \frac{y}{\alpha}\right)$$

If there is another method which can estimate $P_\alpha[w]$ from $P_1[w]$, it is not limited to use the above approximate estimation.

According to the equation (11), the degradation model data $P_\alpha[w]$ is estimated if the degradation model data $P_1[w]$ can be estimated. ($P_1[w]$ indicates the case of $\alpha=1$).

The HR image data $E_{H,b}$ is known data. Further, the image $E_{L,b}$ can be configured from the LF data according to the equation (3). According to the present exemplary embodiment, the resolution of the image $E_{L,b}$ is increased by performing appropriate interpolation so that it is equal to the resolution of the HR image data $E_{H,b}$. Then, the degradation model estimation unit 205 estimates the degradation model data $P_1[w]$ from the following equation.

[Equation 12]

$$E_{L,b} = C_{P_1[w]}^2[E_{H,b}] \quad (12)$$

Here, the degradation model data $P_1[w]$ is determined to minimize a value of V in the following equation.

[Equation 13]

$$V = \sum_{x,y} \left\| C_{P_1[w]}^2[E_{H,b}](x,y) - E_{L,b}(x,y) \right\|^2 + \lambda \sum_{x,y} \|P_1[w]\|^2 \quad (13)$$

$\lambda$ is an arbitrary weighting factor. The solution that minimizes V is obtained by Fourier transform. In other words, the degradation model data $P_1[w]$ is obtained according to the following equation,

[Equation 14]

$$P_1[w] = F^{-1}\left[\frac{F[E_{H,b}]^* F[E_{L,b}]}{|F[E_{H,b}]|^2 + \lambda}\right] \quad (14)$$

where Fourier transform is F[ ]. The asterisk * denotes a complex conjugate. Although, a solution that minimizes V of the equation (13) is obtained by Fourier transform, a different method such as steepest descent method can also be used. Further, different methods can be used as long as the degradation model data $P_1[w]$ can be obtained from the equation (12).

For example, when the following equation is defined,

[Equation 15]

$$w_\alpha(x,y) \equiv \frac{1}{\alpha^2} P_1[w]\left(\frac{x}{\alpha}, \frac{y}{\alpha}\right) \quad (15)$$

the following equation is given according to the equation (11).

[Equation 16]

$$P_\alpha[w] \sim w_\alpha \quad (16)$$

Thus, $P_\alpha[w]$ can be estimated.

Next, the high resolution image estimation unit 206 estimates the HR image $E_{H,ab}$ on the virtual image sensor (the HR image data $E_{H,ab}$ on the virtual image sensor) using the image $E_{L,ab}$ reconfigured from the LF data and degradation model data $w_\alpha$ so that the following equation is satisfied.

[Equation 17]

$$E_{L,ab} = C_{P_\alpha[w]}^2 [E_{H,ab}] \sim C_{w_\alpha}^2 [E_{H,ab}] \quad (17)$$

There are several methods for estimating the HR image data $E_{H,ab}$ that satisfies the equation (17), here, the HR image data $E_{H,ab}$ is determined so that V' in the following equation is minimized.

[Equation 18]

$$V' = \sum_{x,y} \|C_{w_\alpha}^2 [E_{H,ab}](x,y) - E_{L,ab}(x,y)\|^2 + \lambda' \sum_{x,y} \|\Delta E_{H,ab}\|^2 \quad (18)$$

where $\lambda'$ is an appropriate weighting factor and $\Delta$ is the Laplacian. A solution that minimizes V' is obtained by Fourier transform. In other words, the HR image data $E_{E,ab}$ can be estimated by calculating the following equation.

[Equation 19]

$$E_{H,ab} = F^{-1}\left[\frac{F[w_\alpha]^* F[E_{L,ab}]}{|F[w_\alpha]|^2 + \lambda'(|k|^2)^2}\right] \quad (19)$$

where k is the variable of the frequency space.

Although a solution that minimizes the equation (18) is obtained by Fourier transform here, various methods such as the steepest descent method and the conjugate gradient method can also be used. Further, in addition to minimizing the equation (18), the HR image data $E_{E,ab}$ can be obtained using a deconvolution method such as the Richardson-Lucy method. Furthermore, if the HR image data $E_{H,ab}$ can be obtained from the equation (17), the method is not limited to the above-described methods.

Accordingly, the operation of the high resolution image reconfiguration unit 200 can be summarized as follows. First, the degradation model estimation unit 205 estimates the degradation model data $P_1[w]$ using the image $E_{L,b}$ reconfigured according to the equation (2) and the HR image data $E_{H,b}$ according to the equation (13). Next, the degradation model data $P_\alpha[w]$ is derived from the degradation model data $P_1[w]$ according to the equations (14) and (15). Then, the image reconfiguration unit 204 reconfigures the image $E_{L,ab}$ on the virtual image sensor according to the equation (2). Further, the high resolution image estimation unit 206 estimates the HR image data $E_{H,ab}$ on the virtual image sensor using the degradation model data $P_\alpha[w]$ and the image $E_{L,ab}$ according to the equation (18).

In the present exemplary embodiment, in order to simplify the description, the resolution of the HR image data $E_{H,ab}$ on the virtual image sensor is assumed that it is equal to the resolution of the HR image data. However, the resolution of the HR image data $E_{H,ab}$ on the virtual image sensor is not necessarily the same as the resolution of the HR image data. In other words, the resolution of the HR image data $E_{H,ab}$ on the virtual image sensor is acceptable as long as it is higher than the resolution of the image $E_{L,b}$ reconfigured by the image reconfiguration unit 204.

Thus, from the HR image data and the LF data obtained by photographing, the high resolution image reconfiguration unit 200 can reconfigure the HR image data of an arbitrary position on the virtual image sensor after photographing.

Figure 9A:
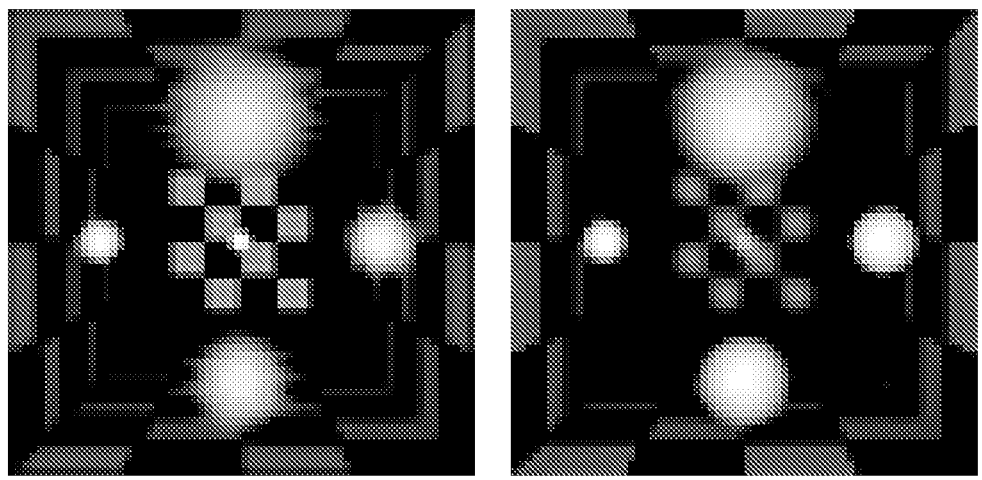
FIGS. 9A and 9B illustrate an effect obtained from the first exemplary embodiment.
Figure 9B:
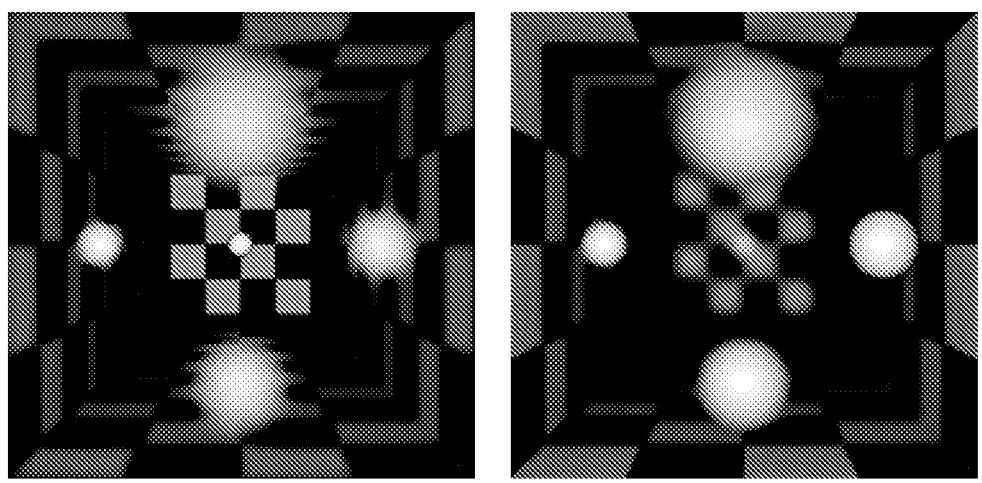

FIGS. 9A and 9B illustrate the effect of the present exemplary embodiment. FIG. 9A illustrates an image obtained by reconfiguring the image $E_{L,ab}$ on the virtual image sensor based on the acquired LF data. FIG. 9B illustrates an image obtained by estimating the HR image data $E_{H,ab}$ on the virtual image sensor with the application of the present exemplary embodiment. From FIGS. 9A and 9B, it is understood that the adjustment of the focus position after photographing is favorably performed with high resolution.

As described above, according to the first exemplary embodiment, by using the data acquired by imaging, the position of the virtual image sensor (focus position) can be adjusted after the photographing with high resolution.

Although the diaphragm 103 is not considered in the first exemplary embodiment in order to simplify the operation, an image processing apparatus according to a second exemplary embodiment can adjust the diaphragm as well as adjust a position of a virtual image sensor after photographing.

Figure 10:
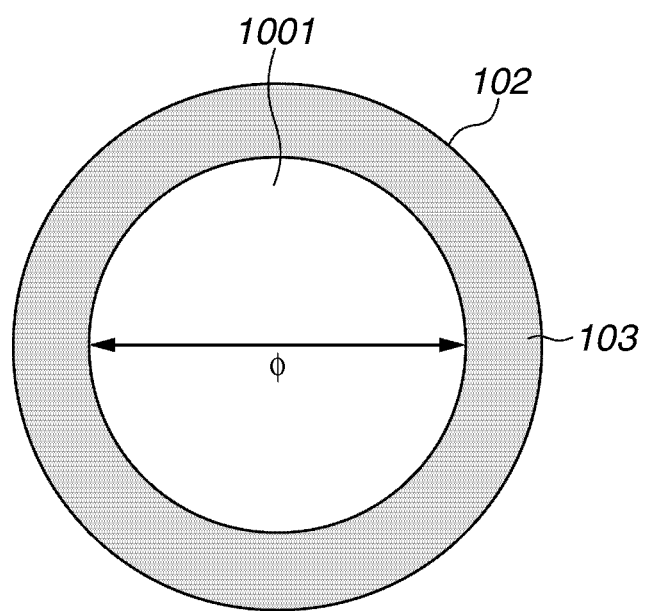
FIG. 10 is a conceptual drawing of a diaphragm.

FIG. 10 is a conceptual drawing of the diaphragm 103. In FIG. 10, an aperture 1001 is the aperture when the effective aperture of the diaphragm is $\phi$.

According to the present exemplary embodiment, image acquired when the effective aperture of the diaphragm is $\phi$ is expressed, for example, as image $E_{H,b,\phi}$. The first subscript "H" represents the resolution, the second subscript "b" represents the distance between the lens and the image sensor, and the third subscript "$\phi$" represents the effective aperture of the diaphragm.

<Block Diagram of the Second Exemplary Embodiment>

Figure 11:
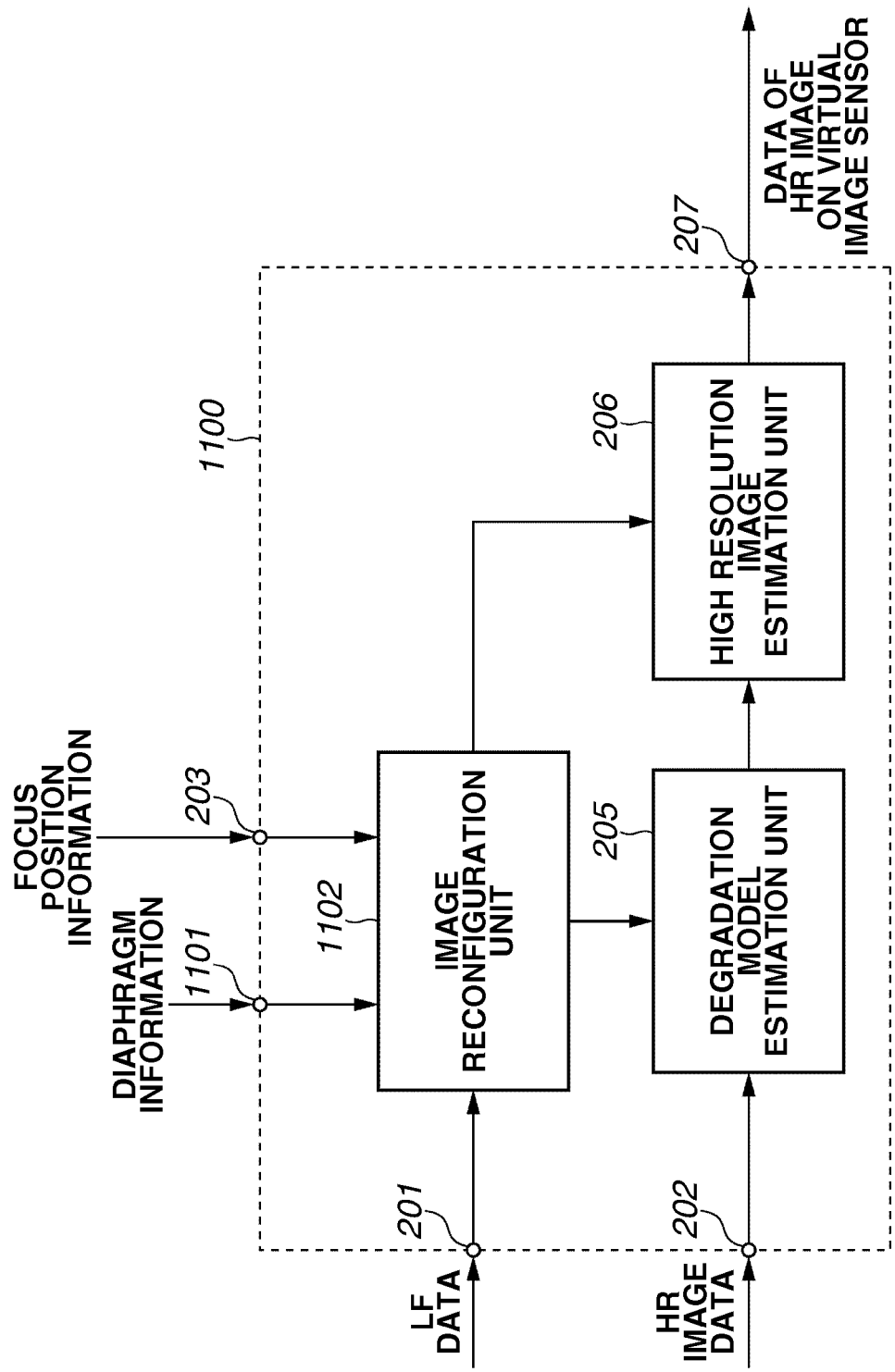
FIG. 11 is a block diagram illustrating the high resolution image reconfiguration unit.

The block diagram of an imaging apparatus according to the present exemplary embodiment is similar to the block diagram in FIG. 1 except for the high resolution image reconfiguration unit. FIG. 11 is a block diagram of a high resolution image reconfiguration unit 1100 according to the present exemplary embodiment. A diaphragm information input terminal 1101 is a terminal to which the effective aperture (virtual stop) of the diaphragm at certain timing is input.

According to the present exemplary embodiment, the LF data and the HR image data is acquired when the effective aperture $\phi$ is at the maximum state ($\phi_{max}$). The effective aperture of the diaphragm when the imaging is actually performed is not necessarily $\phi_{max}$ as long as it is larger than the effective aperture to be adjusted after the photographing. For the sake of simplicity, the subscript $\phi_{max}$ is not used regarding the image obtained when the effective aperture is $\phi_{max}$.

<Operation of the High Resolution Image Reconfiguration Unit 1100>

Figure 12:
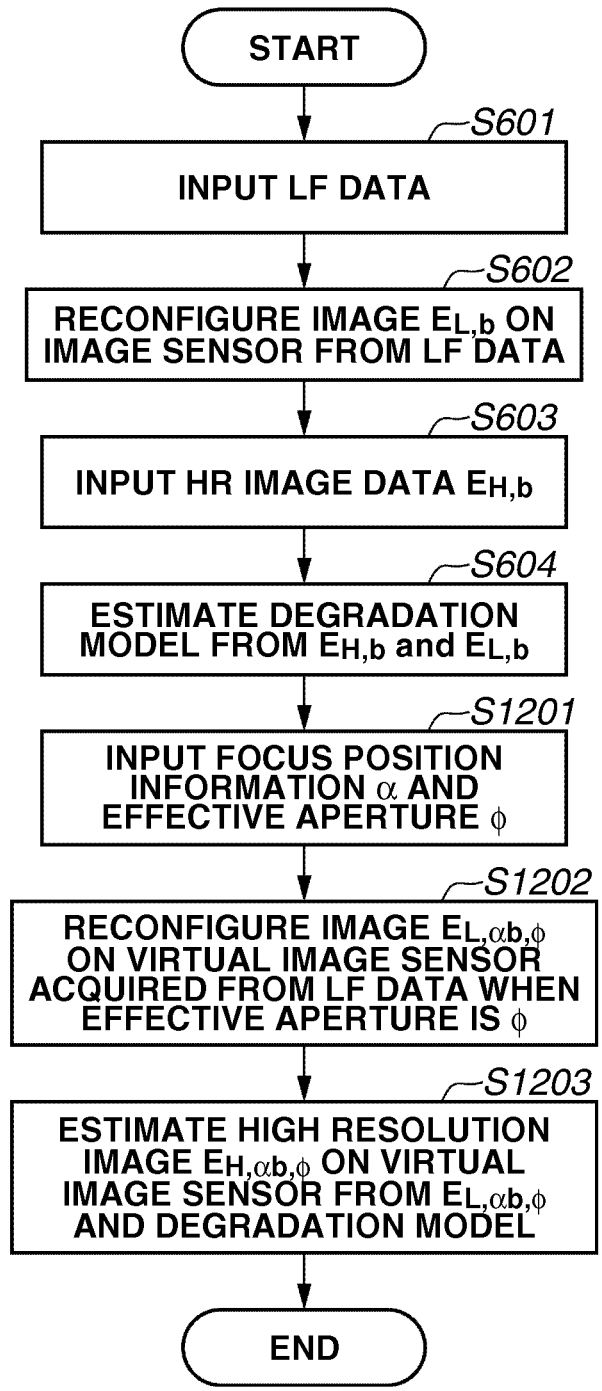
FIG. 12 is a flowchart illustrating an operation of the high resolution image reconfiguration unit.

The high resolution image reconfiguration unit 1100 is a processing unit used for reconfiguring a high resolution image on the virtual image sensor at certain diaphragm timing using the HR image and the LF data. The operation of the high resolution image reconfiguration unit 1100 will be described below with reference to the flowchart in FIG. 12. Here, only the points different from the first exemplary embodiment will be described.

In step S1201, the focus position information $\alpha$ and information about the effective aperture $\phi$ of the diaphragm are respectively input to an image reconfiguration unit 1102 from the focus position information input terminal 203 and the diaphragm information input terminal 1101. In step S1202, with use of the LF data, the image reconfiguration unit 1102 reconfigures image $E_{L,\alpha b,\phi}$ on the virtual image sensor at a distance αb from the lens 102 when the effective aperture of the diaphragm is φ.

In step S1203, the high resolution image estimation unit 206 estimates the high resolution image on the virtual image sensor when the effective aperture of the diaphragm is φ using the degradation model and the image $E_{L,\alpha b,\phi}$. Then, the operation of the high resolution image reconfiguration unit 1100 ends.

<Operation Principle of the High Resolution Image Reconfiguration Unit 1100>

An operation principle of the high resolution image reconfiguration unit 1100 will be described below.

Basically, the operation principle of the high resolution image reconfiguration unit 1100 is similar to that of the high resolution image reconfiguration unit 200 of the first exemplary embodiment. Thus, only the points different from the first exemplary embodiment will be described.

The reconfiguration operators on the virtual image sensor when the effective aperture of the diaphragm is φ are defined as follows.

[Equation 20]

$$P_{\alpha,\phi}[L](x, y) \equiv \frac{1}{\alpha^2 b^2} \int_{A(\phi)} L\left(\frac{(x-u)}{\alpha} + u, \frac{(y-v)}{\alpha} + v, u, v\right) du\, dv \quad (20)$$

where A(φ) is an area of the aperture 1001 when the effective aperture of the diaphragm is φ. Especially, when the effective aperture φ is the largest, the reconfiguration operators are represented as follows.

[Equation 21]

$$P_{\alpha}[L](x, y) \equiv \frac{1}{\alpha^2 b^2} \int_{A(\phi_{max})} L\left(\frac{(x-u)}{\alpha} + u, \frac{(y-v)}{\alpha} + v, u, v\right) du\, dv \quad (21)$$

Further, the convolution operators by the filter w of when the effective aperture of the diaphragm is φ will be defined as follows.

[Equation 22]

$$C_{w,\phi}^2[L](x,y) \equiv \int_{A(\phi)} w(x-x', y-y') L(x',y') dx'dy' \quad (22)$$

[Equation 23]

$$C_{w,\phi}^4[L](x,y,u,v) \equiv \int_{A(\phi)} w(x-x', y-y', u-u', v-v') L(x',y',u',v') dx'dy'du'dv' \quad (23)$$

Then, similar to the equation (9), the following equation is satisfied.

[Equation 24]

$$E_{L,\alpha b,\phi} = C_{P_{\alpha,\phi}[w]}^2 [E_{H,\alpha b,\phi}] \quad (24)$$

Thus, the image $E_{L,\alpha b,\phi}$ on the virtual image sensor at the effective aperture φ can be reconfigured using the following equation according to the acquired LF data.

[Equation 25]

$$E_{L,\alpha b,\phi} = P_{\alpha,\phi}[L_L] \quad (25)$$

Additionally, if a degradation model $P_{\alpha,\phi}[w]$ can be estimated, as is the case with the first exemplary embodiment, the HR image data $E_{H,\alpha b,\phi}$ can be estimated from the equation (19).

Next, the estimation method of the degradation model $P_{\alpha,\phi}[w]$ will be described below.

[Equation 26]

$$P_{\alpha,\phi}[w](x, y) = \frac{1}{\alpha^2 b^2} \int_{A(\phi)} w\left(\frac{x+(\alpha-1)u}{\alpha}, \frac{y+(\alpha-1)v}{\alpha}, u, v\right) du\, dv \quad (26)$$

The equation (26) is given. As is with the first exemplary embodiment, as long as α does not fluctuate widely from 1, the following approximate expression is satisfied.

[Equation 27]

$$P_{\alpha,\phi}[w](x, y) \sim \frac{1}{\alpha^2 b^2} \int_{A(\phi)} w\left(\frac{x}{\alpha}, \frac{y}{\alpha}, u, v\right) du\, dv \quad (27)$$

Figure 13:
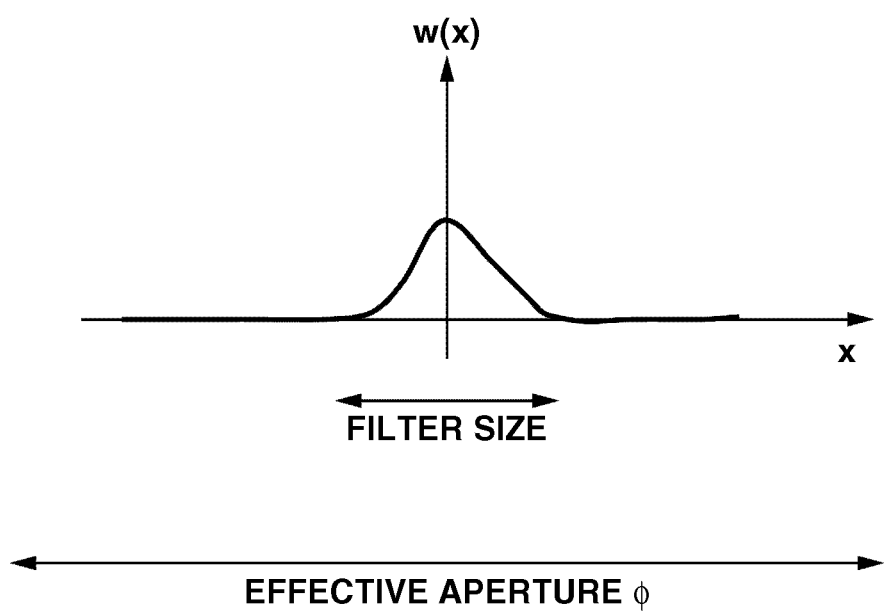
FIG. 13 illustrates a relation between a size of a deterioration filter and an effective aperture of the diaphragm.

Since the filter w is a degradation low pass filter from the high resolution LF to the low resolution LF, the range of w is assumed to be small enough compared to the effective aperture φ. FIG. 13 is a conceptual drawing of the filter w illustrated as an one-dimensional image. As seen from FIG. 13, as long as the aperture of the diaphragm is not extremely reduced in size, the size of the filter w is sufficiently smaller than the effective aperture φ of the diaphragm.

Thus, the following equation is given.

[Equation 28]

$$P_{\alpha,\phi}[w](x, y) \sim \frac{1}{\alpha^2 b^2} \int_{A(\phi)} w\left(\frac{x}{\alpha}, \frac{y}{\alpha}, u, v\right) du\, dv \quad (28)$$

$$\sim \frac{1}{\alpha^2 b^2} \int_{A(\phi_{max})} w\left(\frac{x}{\alpha}, \frac{y}{\alpha}, u, v\right) du\, dv$$

$$= w_\alpha$$

Since the degradation model data $w_\alpha$ can be estimated from the acquired LF data and the HR image data as described in the first exemplary embodiment, the degradation model $P_{\alpha,\phi}[w]$ can be estimated from the equation (28).

Accordingly, the operation of the high resolution image reconfiguration unit 1100 can be summarized as follows. First, the degradation model estimation unit 205 estimates the degradation model data $P_1[w]$ as is the case with the first exemplary embodiment. Next, the degradation model data $P_{\alpha,\phi}[w]$ is derived from the degradation model data $P_1[w]$ according to the equations (15) and (28). Then, the image reconfiguration unit 1102 reconfigures the image $E_{L,\alpha b,\phi}$ on the virtual image sensor when the effective aperture of the diaphragm is φ according to the equation (25). Further, as is the case with the first exemplary embodiment, the high resolution image estimation unit 206 estimates the HR image data $E_{H,\alpha b,\phi}$ on the virtual image sensor when the effective aperture of the diaphragm is φ.

Thus, from the HR image data and the LF data obtained by photographing, the high resolution image reconfiguration unit 1100 can reconfigure a high resolution image at an arbitrary position on the virtual image sensor and with the diaphragm of an arbitrary aperture size.

As described above, according to the second exemplary embodiment, by using the data acquired by imaging, the position of the image sensor (focus position) and the effective aperture of the diaphragm can be adjusted with high resolution after the photographing.

According to the first exemplary embodiment, the LF data and the high resolution image data are acquired using the variable aperture 104. According to a third exemplary embodiment, an imaging apparatus includes a movable (storable) micro lens array arranged in front of an image sensor and acquires the LF data and the high resolution image data.

<Block Diagram of the Third Exemplary Embodiment>

Figure 14:
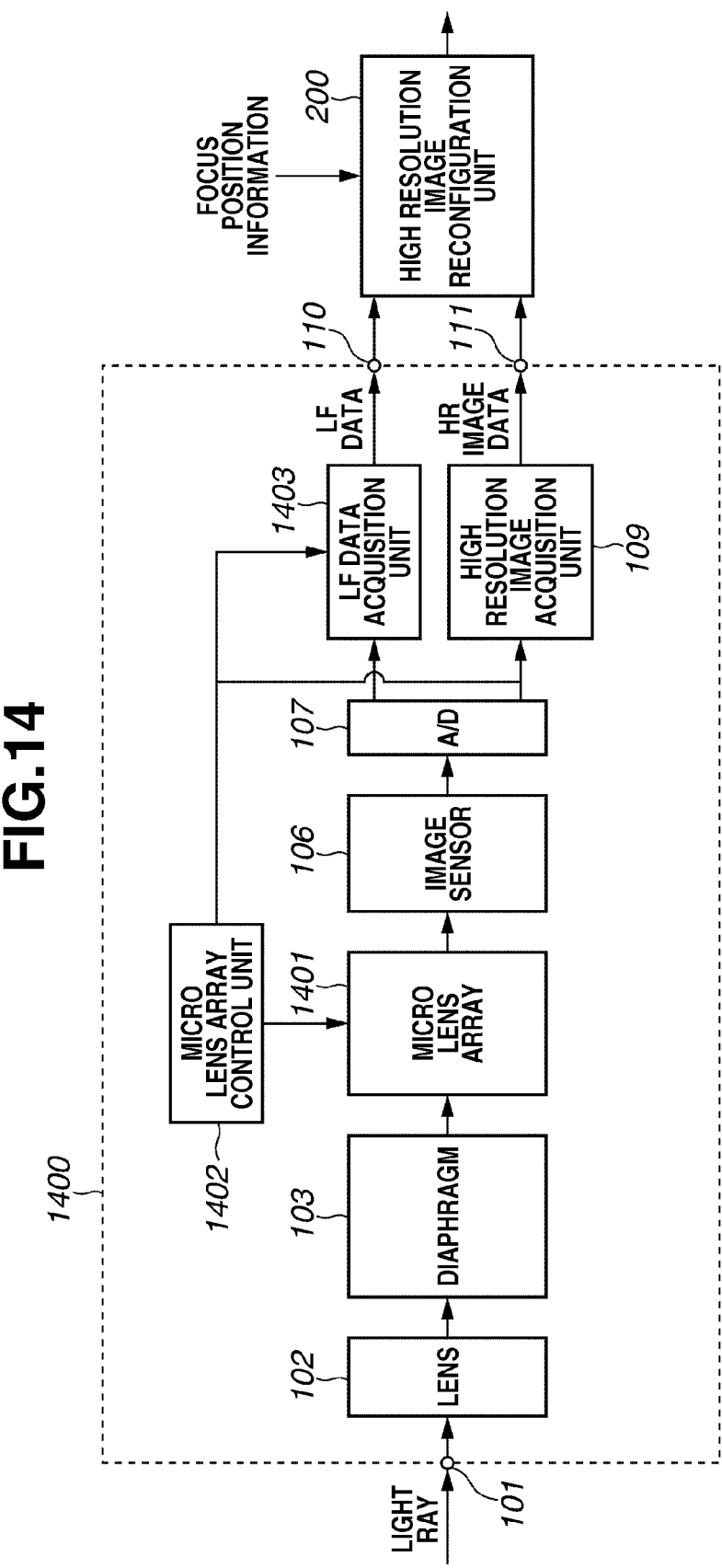
FIG. 14 is a block diagram illustrating an imaging apparatus according to a third exemplary embodiment of the present invention.

FIG. 14 is a block diagram illustrating an example of an image processing method and an image processing apparatus 1400 to which the present exemplary embodiment can be applied. The imaging apparatus 1400 includes a micro lens array 1401 and a micro lens array control unit 1402. The micro lens array control unit 1402 controls the movement and the storage of the micro lens array 1401. When the LF data is acquired, the micro lens array control unit 1402 controls the micro lens array 1401 to move to the front of the image sensor 106.

Further, when the HR image data is acquired, the micro lens array control unit 1402 moves the micro lens array 1401 to a position adjacent to the image sensor 106 or to a position that is not in front of the image sensor 106 and stores it. A LF data acquisition unit 1403 converts a signal obtained from the micro lens array into LF data. The high resolution image reconfiguration unit 200 can be replaced with the high resolution image reconfiguration unit 1100.

Figure 15:
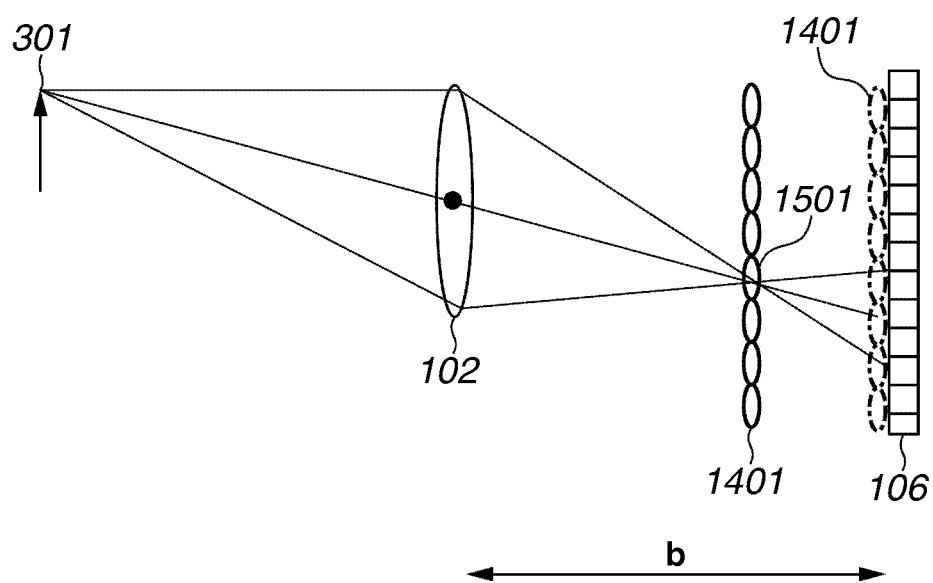
FIG. 15 is a conceptual drawing of the imaging apparatus.

FIG. 15 is a conceptual drawing of the imaging apparatus 1400. In FIG. 15, light rays from a point of the object 301 and emitted in each direction are focused on a micro lens 1501 and separated by the micro lens 1501. An image on the image sensor 106 formed by the incident light rays via the micro lens 1501 corresponds to a parallax image of a point of the object 301.

The micro lens array 1401 represented by a dotted line indicates the position of the micro lens array in the normal photographing mode. If the micro lens array is set in front of the image sensor, the influence on the image of the refraction of the light ray due to the micro lens array is substantially eliminated. Accordingly, HR image data which is equivalent to the image data obtained without the micro lens can be acquired. As another method for acquiring the HR image, the micro lens may be moved to a position (which does not affect the light rays) away from the image sensor.

According to the third exemplary embodiment, the LF data is acquired by setting the micro lens array in front of the image sensor. On the other hand, the HR image data is acquired in the normal photographing mode by moving the micro lens array away from the image sensor or storing it.

As described above, according to the third exemplary embodiment, the LF data and the HR image data is acquired in a state with smaller numbers of photographing compared to the first exemplary embodiment. Then, after the photographing, the position of the image sensor (focus position) and the effective aperture of the diaphragm can be adjusted with high resolution.

According to a fourth exemplary embodiment, the LF data and the high resolution image can be simultaneously acquired using a beam splitter and a micro lens array.

<Block Diagram of the Fourth Exemplary Embodiment>

Figure 16:
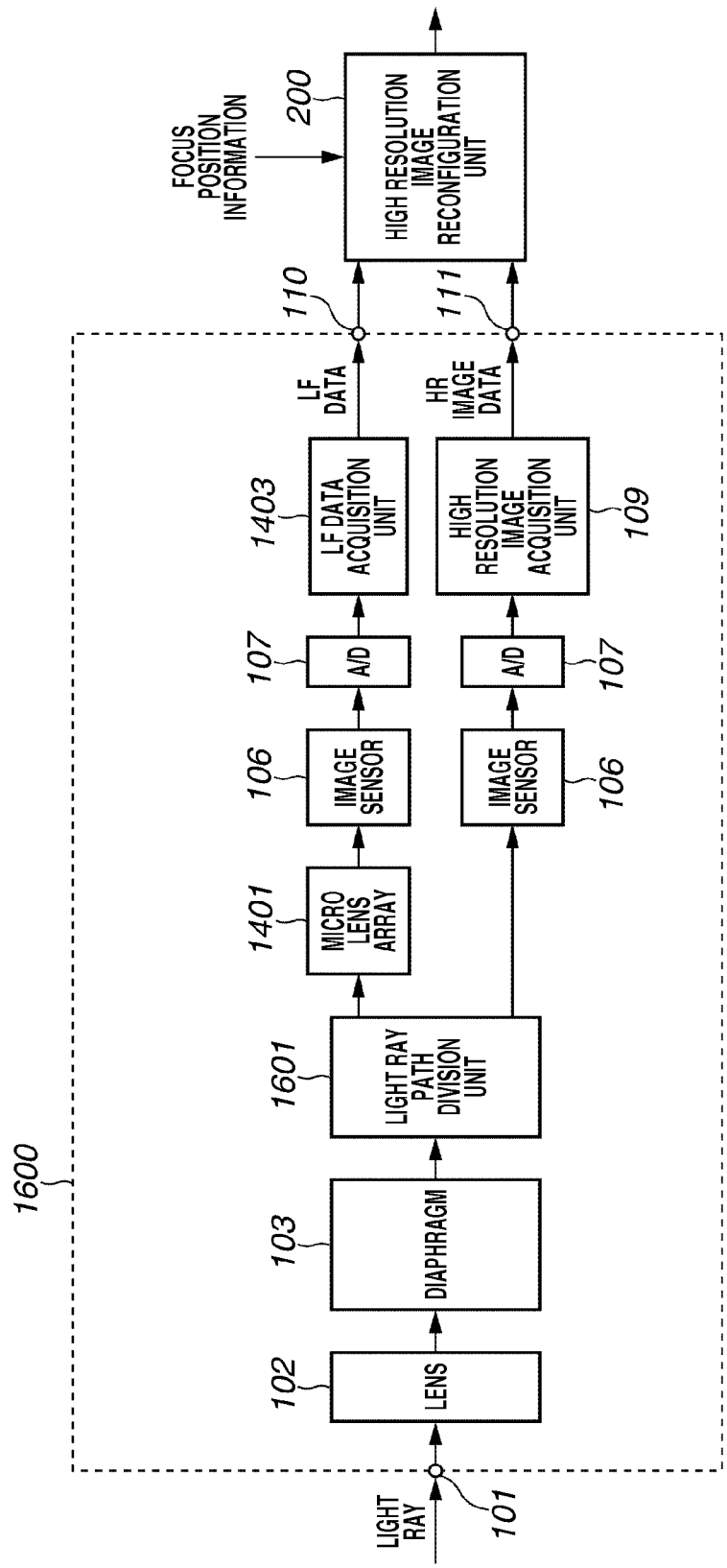
FIG. 16 is a block diagram illustrating an imaging apparatus according to a fourth exemplary embodiment of the present invention.

FIG. 16 is a block diagram illustrating an example of an image processing method and an image processing apparatus 1600 to which the present exemplary embodiment can be applied. The imaging apparatus 1600 includes a light ray path division unit 1601 which divides the light ray path into two. For example, a half mirror can be used for the light ray path division unit 1601. The high resolution image reconfiguration unit 200 can be replaced with the high resolution image reconfiguration unit 1100.

According to the fourth exemplary embodiment, the light ray path is divided into two. The light ray of one of the two paths is incident on the micro lens array 1401 and the LF data is acquired in a manner similar to the manner described in the third exemplary embodiment. On the other hand, the HR image data is acquired from light ray information obtained from the light ray of the other path.

As described above, according to the fourth exemplary embodiment, the LF data and the HR image data are simultaneously acquired and the position of the image sensor (focus position) and the effective aperture of the diaphragm can be adjusted with high resolution after the photographing.

In a fifth exemplary embodiment, a part of or the entire functions of configurations, such as the high resolution image reconfiguration unit, according to the first to fourth exemplary embodiments is implemented by an information processing apparatus outside of the imaging apparatus. More specifically, the LF data and the HR image data obtained by the imaging apparatus are transmitted to the information processing apparatus via a medium (e.g., a network medium and a storage medium), and a part of or the entire functions of the configurations, such as the high resolution image reconfiguration unit, described in the first to fourth exemplary embodiments are realized the information processing apparatus.

Aspects of the present invention can also be realized by a computer of a system or apparatus (or devices such as a central processing unit (CPU) or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-151972 filed Jul. 2, 2010, which is hereby incorporated by reference herein in its entirety.

What is claimed is:

1. An image processing apparatus comprising:
an acquisition unit configured to acquire light ray information including routing information and radiance information of a light ray incident on an imaging apparatus from an object;
a first input unit configured to input virtual position information indicating a virtual position of an image sensor in the imaging apparatus which is different from an actual position of the image sensor;
a first generation unit configured to generate first virtual image data which is obtained if the light ray is imaged at the virtual position of the image sensor with first resolution based on the light ray information and the virtual position information;

a second input unit configured to input high resolution image data indicating a high resolution image obtained by imaging the object with second resolution higher than the first resolution;

a second generation unit configured to generate second virtual image data which is obtained if the light ray is imaged at the virtual position of the image sensor with third resolution higher than the first resolution, based on the first virtual image data and the high resolution image data;

a third generation unit configured to generate low resolution image data which is obtained if the image sensor is at the actual position of the image sensor based on the light ray information; and a conversion model generation unit configured to generate conversion model data used for converting the high resolution image data into the low resolution image data, wherein the second generation unit generates the second virtual image data by converting the first virtual image data based on the conversion model data.

2. The image processing apparatus according to claim 1, wherein the light ray information acquired by the acquisition unit is obtained by temporally changing an aperture shape of a diaphragm in the imaging apparatus.

3. The image processing apparatus according to claim 1, wherein the virtual position information is determined based on a focus position set for the imaging apparatus.

4. A storage medium storing a computer program for causing a computer to function as each unit included in an image processing apparatus according to claim 1.

5. A method for image processing comprising:

acquiring light ray information including routing information and radiance information of a light ray incident on an imaging apparatus from an object;

inputting virtual position information indicating a virtual position of an image sensor in the imaging apparatus which is different from an actual position of the image sensor;

generating first virtual image data which is obtained if the light ray is imaged at the virtual position of the image sensor with first resolution based on the light ray information and the virtual position information and inputting high resolution image data indicating a high resolution image obtained by imaging the object with second resolution higher than the first resolution;

generating second virtual image data which is obtained if the light ray is imaged at the virtual position of the image sensor with third resolution higher than the first resolution, based on the first virtual image data and the high resolution image data;

generating low resolution image data which is obtained if the image sensor is at the actual position of the image sensor based on the light ray information; and generating conversion model data used for converting the high resolution image data into the low resolution image data, wherein the generating second virtual image data generates the second virtual image data by converting the first virtual image data based on the conversion model data.

* * * * *